United States Patent
Lee (10) Patent No.: US 11,654,427 B2
(45) Date of Patent: May 23, 2023

(54) METHOD OF MANUFACTURING A SUPPORTED CATALYST AND SUPPORTED CATALYST MANUFACTURED USING SAME

(71) Applicants: Hyundai Motor Company, Seoul (KR); Kia Corporation, Seoul (KR)

(72) Inventor: Ju Hee Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 17/405,557

(22) Filed: Aug. 18, 2021

(65) Prior Publication Data

US 2022/0280931 A1    Sep. 8, 2022

(30) Foreign Application Priority Data

Mar. 8, 2021    (KR) .................... 10-2021-0029829

(51) Int. Cl.
| | | |
|---|---|---|
| *B01J 37/08* | (2006.01) | |
| *B01J 23/89* | (2006.01) | |
| *B01J 21/18* | (2006.01) | |
| *B01J 35/00* | (2006.01) | |
| *H01M 4/92* | (2006.01) | |
| *B01J 35/10* | (2006.01) | |
| *H01M 4/86* | (2006.01) | |

(52) U.S. Cl.
CPC .............. *B01J 37/08* (2013.01); *B01J 21/18* (2013.01); *B01J 23/892* (2013.01); *B01J 35/0033* (2013.01); *B01J 35/1004* (2013.01); *H01M 4/8657* (2013.01); *H01M 4/921* (2013.01); *H01M 4/926* (2013.01)

(58) Field of Classification Search
CPC ... B01J 37/08; B01J 21/18; B01J 23/38; B01J 23/48; B01J 23/26; B01J 21/066; B01J 23/34; B01J 23/72; B01J 23/892; H01M 4/8657; H01M 4/921; H01M 4/926
USPC ......................................... 502/182, 184, 185
See application file for complete search history.

(56) References Cited

U.S. PATENT DOCUMENTS

| | | | | |
|---|---|---|---|---|
| 2,386,518 A | * | 10/1945 | Upham .................... | B01J 23/26 |
| | | | | 502/355 |
| 7,919,426 B2 | * | 4/2011 | Yoo .......................... | H01M 4/92 |
| | | | | 502/185 |
| 2007/0184972 A1 | * | 8/2007 | Roev ..................... | H01M 4/921 |
| | | | | 502/182 |

FOREIGN PATENT DOCUMENTS

| | | | | |
|---|---|---|---|---|
| KR | 10 1439839 | * | 9/2014 | .............. B01J 23/76 |
| KR | 101439839 B1 | | 9/2014 | |

* cited by examiner

*Primary Examiner* — Patricia L. Hailey
(74) *Attorney, Agent, or Firm* — Fox Rothschild LLP (57) ABSTRACT

Provided is a method of manufacturing a supported catalyst and a supported catalyst manufactured using the same. The method may prevent the growth of catalytic metal particles by repeatedly applying heat, so the method is simpler and more economical than conventional processes. Moreover, since the support in the supported catalyst thus manufactured includes a hollow having a predetermined size, an electrode manufactured using the supported catalyst may ensure a desired electrode thickness even when used in a relatively small amount compared to the conventional technology. Moreover, water generated during operation of a fuel cell can be efficiently discharged, so desired mass transfer resistance can be exhibited, and a high electrochemically active surface area (ECSA) and superior catalytic activity can be attained.

20 Claims, 6 Drawing Sheets

METHOD OF MANUFACTURING A SUPPORTED CATALYST AND SUPPORTED CATALYST MANUFACTURED USING SAME

CROSS REFERENCE TO RELATED APPLICATION

The present application claims priority based on Korean Patent Application No. 10-2021-0029829, filed on Mar. 8, 2021, the entire content of which is incorporated herein for all purposes by this reference.

TECHNICAL FIELD

The present invention relates to a method of manufacturing a supported catalyst by heat-treatment and a supported catalyst manufactured using the same.

BACKGROUND

A polymer electrolyte membrane fuel cell (PEMFC) is a high-power fuel cell having high current density, and for application thereof to vehicles, it is necessary to ensure high power output performance of at least tens of kW under various driving conditions. For example, stable operation over a wide current density range, no leakage, and fast operation are required.

The reaction for the generation of electricity in a fuel cell occurs in a membrane-electrode assembly (MEA) including an ionomer-based membrane and electrodes including an anode and a cathode.

In order to increase the performance of an electrode for a polymer electrolyte membrane fuel cell, the proton conductivity and hydrophilicity of the electrode and the catalyst included in the electrode must be increased. Accordingly, an alloy catalyst is being used as a catalyst for a fuel cell, and a technique for increasing catalytic activity through heat treatment may be used when manufacturing an alloy catalyst for a fuel cell.

In addition, in order to reduce the cost of manufacturing a fuel cell while maintaining catalytic activity, research is ongoing into decreasing the amount of platinum (Pt) and increasing the performance by alloying a conventional platinum-based carbon catalyst (Pt/C) with a transition metal that is relatively easy to purchase and inexpensive. Various methods of synthesizing such a multi-component alloy catalyst have been studied, but almost all methods essentially require an ultra-high-temperature heat treatment step in order to ensure the crystallinity of the finished alloy catalyst.

Meanwhile, based on the chemical mechanism, growth of particles is inevitable during continuous heat treatment of nanoparticles at a high temperature (e.g., 100 to 900° C.). For example, the electrochemically active surface area (ECSA) in the catalytic reaction may decrease depending on the growth of the size of catalyst particles, which is very disadvantageous from the aspects of performance and durability of the fuel cell.

Accordingly, when manufacturing an alloy catalyst, the nanoparticles are typically coated with a polymer and then heat-treated at a high temperature to prevent the growth of the catalyst particles during high-temperature heat treatment. In addition, after the heat treatment process, removing the coated polymer by performing an etching process using sulfuric acid or through ozone treatment is essentially performed. As such, qualitative analysis may be performed in various ways in order to confirm proper removal.

However, the process of performing heat treatment after coating with the polymer as described above increases the complexity of processing, resulting in increased processing time and cost. Accordingly, there is a need for a method for effective heat treatment of a metal catalyst for a fuel cell for maintaining and improving performance without adding steps.

In addition, since the conventional process of manufacturing the catalyst is only able to control the size of the catalyst on the scale of a catalytic metal, research into processes of manufacturing a supported catalyst capable of efficiently manufacturing a supported catalyst by controlling the structure not only of the catalytic metal but also of the support on which the metal is supported and capable of improving aspects of performance such as mass transfer resistance and the like is still insufficient to address the problem described above.

SUMMARY

In preferred aspects, provided is a method of manufacturing, e.g., by heat treatment, a supported catalyst. The method may include applying heat to a supported catalyst in several processes (for example, including heating to a first temperature, repeated heat treatment of repeatedly performing heating to a second temperature and cooling to a third temperature, and cooling to a fourth temperature) which are repeatedly performed at least one time.

Also provided is a supported catalyst manufactured by the method described herein. The supported catalyst may include a metal and a carbon support having a hollow form having a predetermined size.

The objectives of the present invention are not limited to the foregoing, and will be able to be clearly understood through the following description and to be realized by the means described in the claims and combinations thereof.

In an aspect, provided is a method of manufacturing, e.g., by heat treatment, a supported catalyst. The method may include preparing a supported catalyst including a catalytic metal and a carbon support and heat treating the supported catalyst. The heat treating may include first heating the supported catalyst to a first temperature, second heating the supported catalyst to a second temperature and first cooling to a third temperature, and second cooling to a fourth temperature. In particular, a process including the second heating and the first cooling may be repeated at least one time. Further, the heat treating may be repeated at least one time.

The supported catalyst may include one or more catalytic metals supported on the carbon support.

The catalytic metal may include one or more metals selected from the group consisting of platinum (Pt), iridium (Ir), rhodium (Rh), ruthenium (Ru), palladium (Pd), gold (Au), silver (Ag), cobalt (Co), iron (Fe), nickel (Ni), manganese (Mn), copper (Cu), chromium (Cr), and zirconium (Zr).

The preparing the supported catalyst may further include subjecting the prepared supported catalyst to surface polymerization with a conductive polymer.

The conductive polymer may include one or more selected from the group consisting of poly(3,4-ethylenedioxythiophene) [PEDOT], polyacetylene, polyphenylene vinylene, polypyrrole, polythiophene, polyaniline, and polyphenylene sulfide.

The first heating may be performed for about 30 to 90 minutes at a temperature of about 400 to 590° C.

The method may further include, after the first cooling before repeating the second heating, third cooling the supported catalyst to a fifth temperature of about 290 to 310° C.

The second temperature may be about 340 to 360° C.

The third temperature may be about 240 to 260° C.

In the second heating, the supported catalyst may be maintained at the second temperature for a predetermined time.

The predetermined time for maintaining the second temperature may be about 8 to 12 minutes.

In the third cooling, the supported catalyst may be maintained at the third temperature for a predetermined time.

The predetermined time for maintaining the third temperature may be about 8 to 12 minutes.

The process including the second heating and the first cooling may be performed and repeated for about 5 to 30 hours.

The process including the second heating and the first cooling may be repeated 15 to 90 times.

The fourth temperature may be about 23 to 27° C.

The second cooling may be performed for 5 seconds or less.

The heat treating the supported catalyst may be performed for about 3 times or more.

In an aspect, provided is a supported catalyst manufactured by the method described herein. The supported catalyst may include the catalytic metal and a carbon support. The catalyst may be supported on the carbon support.

The support may include a hollow form having a size of about 10 to 100 nm.

According to various exemplary embodiment of the present invention, the method of manufacturing, e.g., by heat treatment, a supported catalyst may prevent the growth of catalytic metal particles by repeatedly applying heat in a complex manner, so the method of the present invention may provide simpler and more economical processes.

In addition, since the support in the supported catalyst manufactured using the above method includes a hollow form having a predetermined size, an electrode manufactured using the supported catalyst can ensure the desired electrode thickness even when used in a relatively small amount compared to the conventional technology. Moreover, water generated during the operation of a fuel cell can be efficiently discharged, so desired mass transfer resistance can be exhibited, and a high electrochemically active surface area (ECSA) and superior catalytic activity can be attained.

The effects of the present invention are not limited to the foregoing, and should be understood to include all effects that can be reasonably anticipated from the following description.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.010% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

A conventional method of manufacturing a catalyst is disadvantageous because complicated steps such as heat treatment, etching, qualitative analysis and the like are performed in order to prevent the growth of catalytic metal particles, and also because the catalyst is manufactured on the scale of catalytic metal particles.

Provided is a method of manufacturing a supported catalyst to address the problems in the conventional method. For instance, when the supported catalyst is manufactured in a manner in which the steps of heating to a specific temperature for a predetermined time, repeated heat treatment of repeatedly performing heating and cooling, and then cooling to another specific temperature are repeatedly performed. As such, growth of catalytic metal particles may be prevented merely by repeatedly applying heat in a complex manner. Moreover, electrode including the supported catalyst thus manufactured exhibits mass transfer resistance as desired, and a high electrochemically active surface area (ECSA) and superior catalytic activity may be ensured, thus culminating in the present invention.

Figure 1:
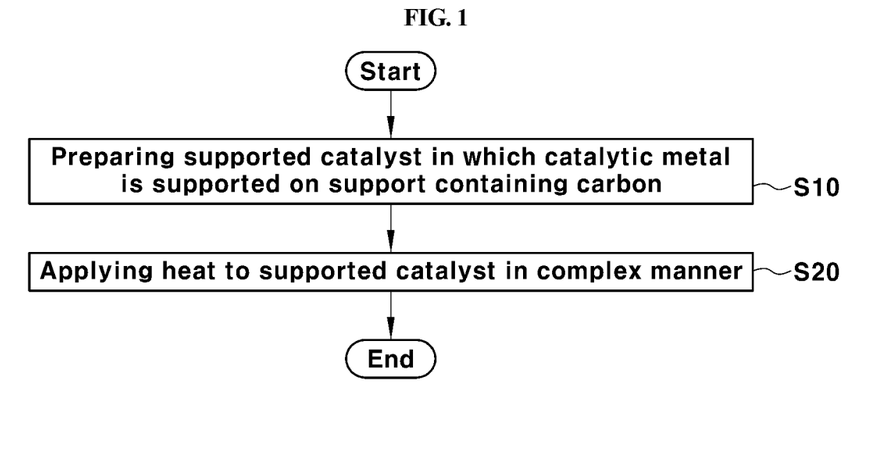
FIG. 1 shows a flowchart schematically showing an exemplary process for heat treatment of a supported catalyst according to an exemplary embodiment of the present invention.

FIG. 1 shows a flowchart schematically showing an exemplary process for heat treatment of a supported catalyst according to an exemplary embodiment of the present invention.

The method of manufacturing, e.g., by heat treatment, a supported catalyst includes preparing a supported catalyst that includes a catalytic metal and a carbon support (S10) and heat treating the supported catalyst (S20). The catalyst metal may be supported in the carbon Preparing the supported catalyst (S10) is a step of preparing a supported catalyst in which a catalytic metal is supported on a support containing carbon.

Preparing the supported catalyst may be performed through at least one process selected from the group consisting of typical processes of manufacturing a supported catalyst useful in the present invention, for example, a ultrasonicated polyol synthesis (UPS) process for supporting a catalytic metal on a support using ultrasonication, a polyol synthesis process capable of supporting a catalytic metal on a support using polyol and heat treatment and controlling the particle size and the support ratio by adjusting the pH, and a process of supporting a catalytic metal on a support using UV light, and is not limited to a specific manufacturing process. Preferably, a UPS process, which is relatively simple to use to synthesize an alloy catalyst, may be performed.

For instance, preparing the supported catalyst includes mixing one or more catalytic metal precursor, a support containing carbon, and a solvent to afford a mixture, ultrasonicating the mixture at a frequency of about 100 Hz for about 3 hours, filtering the ultrasonicated mixture to obtain a filtrate, and washing and drying the filtrate, thereby preparing a supported catalyst in which a catalytic metal is supported on a support containing carbon. The catalytic metal precursor, the support, and the solvent that are used may be typical ones that are useful in the present invention, and are not limited to specific types.

The supported catalyst thus obtained may be a supported catalyst in which one or more metals are supported on a support containing carbon.

Preferably, the supported catalyst is a supported catalyst ($L_x$/C, in which x is greater than 0) in which a first catalytic metal (L) is supported alone on a support; a supported catalyst ($L_xM_y$/C, in which x and y are greater than 0), as a binary metal catalyst, in which a first catalytic metal (L) and a second catalytic metal (M), which is different from the first catalytic metal (L), are supported on a support; or a supported catalyst ($L_xM_yN_z$/C, in which x, y, and z are greater than 0), as a ternary metal catalyst, in which a first catalytic metal (L), a second catalytic metal (M), which is different from the first catalytic metal (L), and a third catalytic metal (N), which is different from the second catalytic metal, are supported on a support.

Each of the first catalytic metal (L), the second catalytic metal (M), and the third catalytic metal (N) may be independently any one metal selected from the group consisting of platinum (Pt), iridium (Ir), rhodium (Rh), ruthenium (Ru), palladium (Pd), gold (Au), silver (Ag), cobalt (Co), iron (Fe), nickel (Ni), manganese (Mn), and copper (Cu).

After preparation of the supported catalyst, polymerization of the surface of the supported catalyst prepared as described above with a conductive polymer may be further performed. The conductive polymer may be polymerized on the surface of the supported catalyst, thereby protecting the supported catalyst from heat in the subsequent step of applying heat in a complex manner in order to prevent catalytic metal particles from growing to a specific size or more.

The conductive polymer polymerized on the surface of the supported catalyst may be a polymer that may prevent the growth of the catalytic metal particles in the supported catalyst in the subsequent step of applying heat in a complex manner. The conductive polymer may include, for example, one or more selected from the group consisting of poly(3,4-ethylenedioxythiophene) (PEDOT), polyacetylene, polyphenylene vinylene, polypyrrole, polythiophene, polyaniline, and polyphenylene sulfide. Preferably, PEDOT, which enables simple homogeneous polymerization and has good heat resistance, may be used.

After polymerization of the surface of the supported catalyst with the conductive polymer, a heat-treated supported catalyst may be obtained through the step of applying heat to the surface-polymerized supported catalyst in a complex manner.

Conventionally, in order to manufacture a supported catalyst containing a polymer, a catalyst has been manufactured through simple heat treatment at a high temperature. However, the conventional method is problematic in that two or more processes of controlling the structure of the support alone and then supporting catalyst particles thereon have to be separately performed in order to obtain a support in a hollow form due to the increased crystallinity of carbon serving as the support.

In contrast, the method described herein, before the support containing carbon makes it difficult to manufacture a hollow form due to the increased crystallinity thereof, may include applying heat in a complex manner, including a mobility-imparting step, a stabilization and size deviation reduction step, and a quenching step, is performed, so a shape such as a hollow form may be formed through precise manufacture on the scale of a supported catalyst, thereby improving the performance of an electrode manufactured using the supported catalyst having the above shape.

Figure 2:
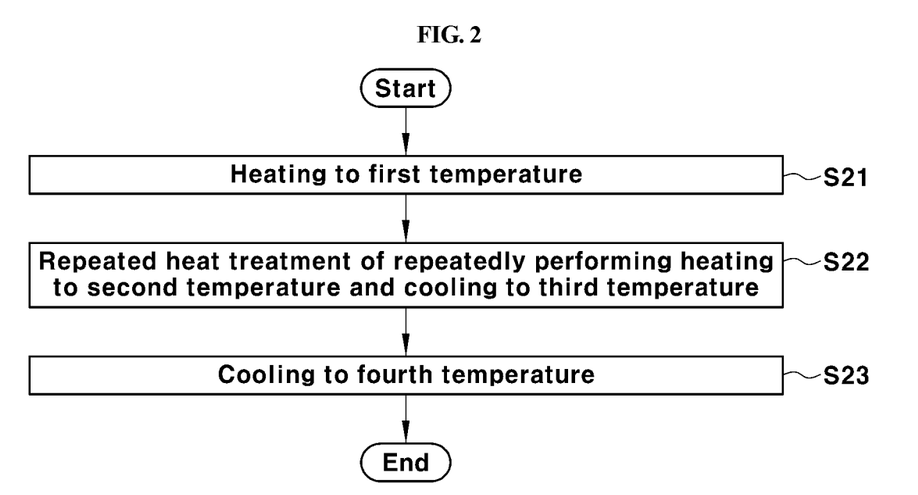
FIG. 2 shows a flowchart schematically showing an exemplary heat treating process (S20) according to an exemplary embodiment of the present invention.
Figure 3:
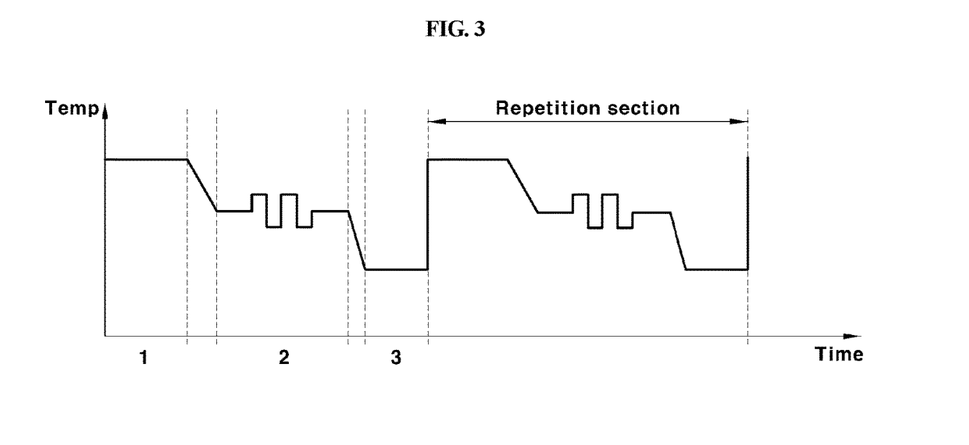
FIG. 3 shows a graph showing an exemplary heat-treating according to an exemplary embodiment of the present invention, expressed as a change in temperature over time.
Figure 4:
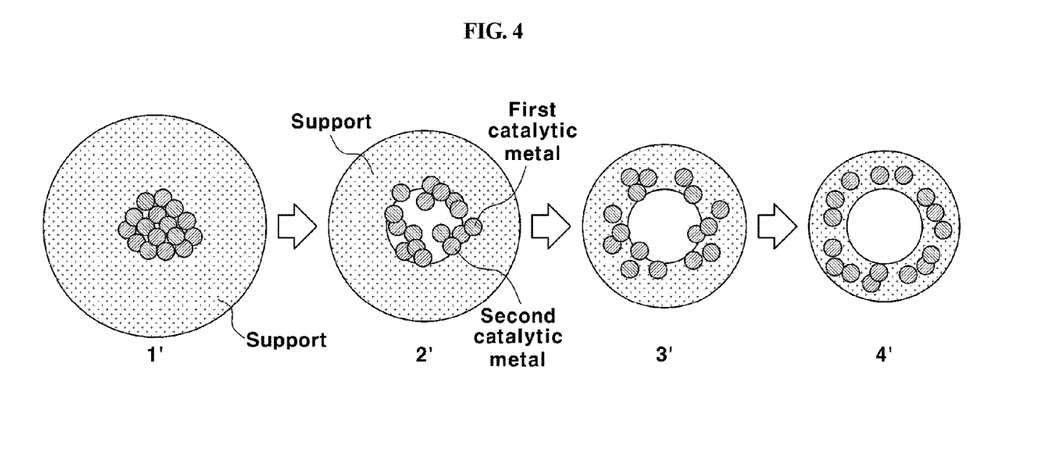
FIG. 4 shows cross-sectional views showing a change in the shape of an exemplary supported catalyst during application of heat in a complex manner according to an exemplary embodiment of the present invention.

As shown in FIGS. 2 to 4, the heat treating (S20) is described in detail below.

FIG. 2 shows a flowchart schematically showing an exemplary process of second heating and first cooling (S20) according to an exemplary embodiment of the present invention.

FIG. 3 shows a graph showing the process of the second heating and first cooling repeatedly according to an exemplary embodiment of the present invention, expressed as a change in temperature over time.

FIG. 4 shows cross-sectional views showing a change in the shape of the supported catalyst during application of heat in a complex manner according to an exemplary embodiment of the present invention.

As shown in FIG. 2, the process of applying heat in a complex manner or first heating (S20) may include heating to a first temperature (S21), repeated heat treatment (process) of repeatedly performing heating to a second temperature (second heating) and cooling to a third temperature (first cooling) (S22), and cooling to a fourth temperature or second cooling (S23).

Figure 5A:
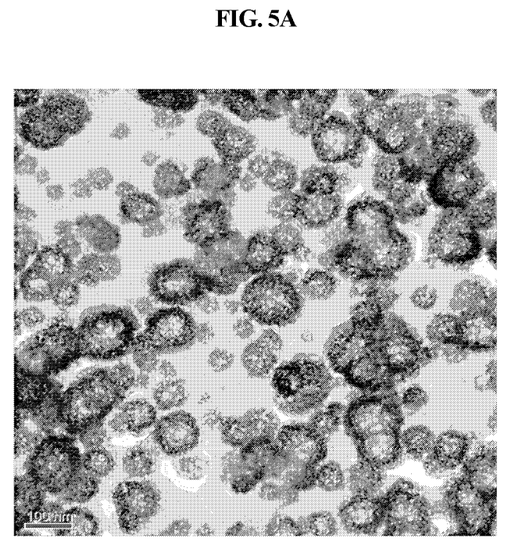
FIG. 5A shows an SEM image of an exemplary supported catalyst that is surface-polymerized with a conductive polymer according to an exemplary embodiment of the present invention.

As shown in FIG. 3, the first heating to the first temperature (S21) is a step (1) for preparing a supported catalyst by heating the supported catalyst surface-polymerized with the conductive polymer to a first temperature for a predetermined time to impart mobility to the support and the catalytic metal such that aggregation of the catalytic metal is reduced and such that the support is able to have a hollow form. FIG. 5A shows an SEM image of the supported catalyst surface-polymerized with the conductive polymer. Accordingly, as shown in FIGS. 4 and 5A, the supported catalyst surface-polymerized with the conductive polymer may be in the form in which only mobility is imparted and a change thereof into a special form is not visibly observed (1').

Preferably, the first temperature may range from about 400 to about 590° C. When the first temperature is less than about 400° C., it is difficult to control the structure to ensure the mobility of the catalytic metal particles in the state in which the conductive polymer is protected. When the first temperature is greater than about 590° C., it may exceed the heat capacity of the surface-polymerized conductive polymer in order to protect the supported catalyst from heat, so the catalytic metal particles may aggregate, making it difficult to control the structure of the support and ensure catalytic activity.

In addition, the time taken to maintain heating to the first temperature may be set for about 30 to 90 minutes. When the maintenance time at the first temperature is less than about 30 minutes, it is difficult to sufficiently ensure the mobility of the catalytic metal particles. When the maintenance time at the first temperature is greater than about 90 minutes, the conductive polymer, which is a buffer, suitable for use as a protective coating layer, may be damaged due to the long heat treatment time at the high temperature, or the catalytic metal particles may aggregate due to the difficulty protecting the same from heat.

As shown in FIG. 3, before the repeated heat treatment (S21), cooling the supported catalyst, heated to the first temperature, to a temperature of about 290 to 310° C. may be further performed. This is to sufficiently ensure the mobility of the internal catalytic metal particles. When the cooling temperature is less than about 290° C., the mobility of the particles may not be obtained due to the presence of the buffer polymer layer. On the other hand, when the cooling temperature is greater than about 310° C., the process may be repeated tens of times at that temperature, so the nanoparticles may escape from the buffer layer due to the excessively high mobility thereof, making it difficult to control the desired support ratio.

As shown in FIG. 3, the repeated heat treatment (S22) is a step (2) in which the supported catalyst heated to the first temperature is cooled to a temperature of about 290 to 310° C., after which heating to a second temperature and cooling to a third temperature may be repeated about 15-90 times, thus stabilizing the fluidized supported catalyst, thereby decreasing the size deviation of the supported catalyst and gradually improving the exposure of the catalytic metal in the supported catalyst, ultimately increasing the activity of the catalytic metal. Accordingly, as shown in FIG. 4, the supported catalyst, which is surface-polymerized with the conductive polymer and is imparted with mobility, may gradually take a hollow form, and the catalytic metal may gradually be uniformly dispersed (2').

Preferably, the supported catalyst may be heated to a second temperature, maintained at the second temperature for a predetermined time, and then cooled to a third temperature.

As such, the second temperature may be about 340 to 360° C., and the predetermined time of maintenance at the second temperature may be about 8 to 12 minutes. When the second temperature is less than about 340° C., sufficient mobility of the catalytic metal particles is not ensured. When the second temperature is greater than about 360° C., the catalytic metal particles escape from the support due to the excessively high mobility thereof, making it difficult to control the structure as desired. Also, when the predetermined time of maintenance at the second temperature is less than about 8 minutes, the mobility of the catalytic metal particles may not be sufficiently obtained. When the predetermined time of maintenance at the second temperature is greater than 12 minutes, the catalytic metal particles may escape from the support and the catalyst may be thus lost.

In addition, one cycle of repeated heat treatment or process including the second heating and first cooling may be performed by maintaining the supported catalyst cooled to the third temperature for a predetermined time at the third temperature and then heating the same to the second temperature again.

As such, the third temperature may be about 240 to 260° C., and the predetermined time of maintenance at the third temperature may be about 8 to 12 minutes. When the third temperature is less than about 240° C. or when the predetermined time of maintenance at the third temperature is less than about 8 minutes, the temperature deviation from the previous section increases beyond a certain value, so the size deviation between catalytic metal particles may be fixed to a specific size (structure), rather than decreasing. On the other hand, when the third temperature is greater than about 260° C. or when the predetermined time of maintenance at the third temperature is greater than about 12 minutes, additional mobility may be imparted, rather than reducing the deviation between catalyst particles as described above.

Preferably, when one cycle of the process or the repeated heat treatment is set as one time, the number of times the repeated heat treatment may be performed may be about 15 to 90, and the total repeated heat treatment time may be about 5 to 30 hours. When the number of times the repeated heat treatment is performed is less than about 15 times or when the repeated heat treatment time is less than about 5 hours, it is difficult to obtain the structure-controlled catalytic metal particles as desired, making it difficult to achieve the desired effect of increasing catalytic activity. On the other hand, when the number of times the repeated heat treatment is performed is greater than about 90 times or when the repeated heat treatment time is greater than about 30 hours, the movement of the catalytic metal may be terminated, making it impossible to achieve a higher electrochemically active surface area (ECSA) in the electrode including the same.

As shown in FIG. 3, the cooling to the fourth temperature or second cooling (S23) may be a step (3) in which the supported catalyst subjected to repeated heat treatment may be rapidly cooled to a fourth temperature, thus decreasing and fixing the mobility of the catalyst and the support. Accordingly, as shown in FIG. 4, the supported catalyst in which a hollow form is gradually completed through the repeated heat treatment and the catalytic metal may be gradually uniformly dispersed may be fixed (3').

Preferably, the supported catalyst subjected to repeated heat treatment may be cooled to the fourth temperature, which is less than the third temperature by about 200° C. to 300° C. or greater, within about 5 seconds. Here, the fourth temperature may preferably be about 23 to 27° C. The lower the fourth temperature, the better the quenching effect. When the fourth temperature is greater than about 27° C., quenching may not be performed well.

Preferably, when one cycle of applying heat in a complex manner (S20), including heating to the first temperature (S21), repeated heat treatment (S22) of repeatedly performing heating to the second temperature and cooling to the third temperature (S22), and cooling to the fourth temperature (S23), is set as one time, the number of times the heat is applied in a complex manner may be 3 or more, and preferably 3 to 5. Here, when the number of times the heat is applied in a complex manner is less than 3, the catalyst structure may not be properly controlled, so the desired activity may be obtained. On the other hand, when the number of times the heat is applied in a complex manner is greater than 5, the catalytic metal particles may escape from the support due to the mobility imparted thereto, so the catalyst may be lost.

When the step of applying heat in a complex manner (S20) is repeatedly performed, the growth of the catalytic metal particles may be prevented in a manner that is simpler and more economical than the conventional process. In addition, the process of hollowing the support may be more precisely carried out, as well as the uniform dispersion of the catalytic metal, due to fluidization of the catalytic metal and the support, whereby control on the scale of a supported catalyst is possible, thus making it possible to adjust the performance of the electrode including the same, such as an electrochemically active surface area, etc.

Figure 5B:
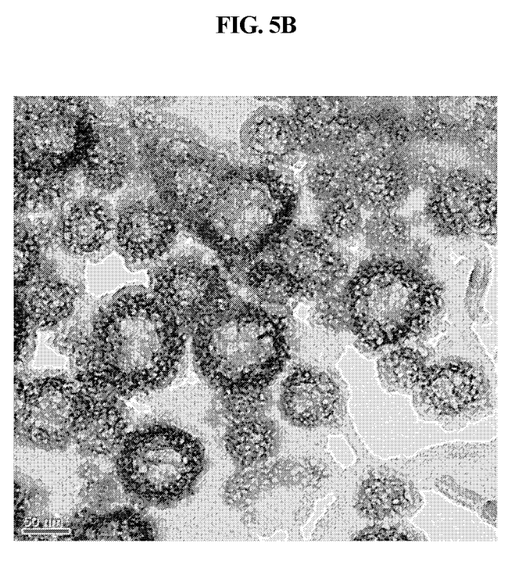
FIG. 5B shows an SEM image of an exemplary supported catalyst manufactured using the manufacturing process according to an exemplary embodiment of the present invention.

The supported catalyst according to an exemplary embodiment of the present invention is manufactured using the method characterized above, so a metal may be supported on a support containing carbon. FIG. 5B is an SEM image of a supported catalyst manufactured using an exemplary manufacturing method according to an exemplary embodiment of the present invention. As shown in FIGS. 4 and 5B, the support may be a supported catalyst which includes a hollow form and in which the catalytic metal supported thereon is uniformly dispersed (4'), and preferably, the size of the hollow form in the support is 10 to 100 nm.

Since the supported catalyst manufactured includes a hollow form having a predetermined size, the electrode manufactured using the supported catalyst may ensure a desired electrode thickness even when used in a relatively small amount compared to the conventional technology. In addition, since water generated during operation of a fuel cell may be efficiently discharged, desired mass transfer resistance may be exhibited, and a high electrochemically active surface area (ECSA) and superior catalytic activity may be ensured.

EXAMPLE

A better understanding of the present invention may be obtained through the following examples and comparative examples. However, these examples are merely set forth to illustrate the present invention, and are not to be construed as limiting the scope of the present invention.

Examples 1 to 3: Manufacture of Heat-Treated Supported Catalyst (S10) As a supported catalyst in which at least two metals were supported on a support containing carbon, $Pt_xNi_y/C$ (in which x and y are 1 or more) was prepared.

Specifically, $PtCl_4$ as a platinum (Pt) precursor, $NiCl_2$ as a nickel (Ni) precursor, and ethylene glycol as a solvent were prepared and mixed to afford a mixture. Thereafter, the mixture was ultrasonicated at 100 Hz for 3 hours, after which the ultrasonicated mixture was filtered to obtain a filtrate, and the filtrate thus obtained was washed and dried, thus obtaining a supported catalyst.

The supported catalyst thus obtained was further subjected to surface polymerization with a conductive polymer, thereby obtaining a supported catalyst surface-polymerized with poly(3,4-ethylenedioxythiophene) [PEDOT] as the conductive polymer.

Specifically, 0.5 g of the supported catalyst $Pt_xNi_y/C$ (in which x and y are greater than 0) was completely dispersed in an ethanol solvent, after which 1.2 g of EDOT (ethylene dioxythiophene) and 10 g of a sulfuric acid aqueous solution were added thereto, followed by stirring for 1 hour to afford a mixture. Then, the mixture was placed in an ice bath at a temperature of 0° C., after which a solution obtained by completely dispersing 0.4 g of APS (ammonium persulfate) in an ethanol solvent was added at a rate of 0.2 mL/sec to the mixture manufactured as described above. Then, the resulting mixture was stirred for 3 to 4 hours to react and become synthesized, thus obtaining a composite. After completion of the reaction, the composite was washed several times with deionized (DI) water, filtered under reduced pressure, and dried in an oven at a temperature of 80° C. for 12 hours, thereby obtaining a supported catalyst surface-polymerized with the conductive polymer.

(S20) Applying heat to the supported catalyst surface-polymerized with the conductive polymer in a complex manner was performed a total of three times, thereby obtaining a heat-treated supported catalyst.

Specifically, the process of applying heat in a complex manner was as follows.

(S21) The supported catalyst surface-polymerized with the conductive polymer was heated to a first temperature of 500° C. for 60 minutes.

(S22) The supported catalyst heated to the first temperature was cooled to a temperature of 300° C., after which repeated heat treatment was performed a total of 90 times for a total of 30 hours (Example 1), a total of 30 times for a total of 10 hours (Example 2), and a total of 15 times for a total of 5 hours (Example 3).

Specifically, one iteration of the repeated heat treatment, that is, one cycle, was heating the supported catalyst, having been cooled to a temperature of 300° C., to a second temperature of 350° C., and maintaining the same at the second temperature for 10 minutes, followed by cooling to a third temperature of 250° C. and then maintenance at the third temperature for 10 minutes.

(S23) The supported catalyst subjected to repeated heat treatment was cooled to a fourth temperature of 25° C. Here, the time taken for cooling to the fourth temperature was equal to or less than 5 seconds.

Comparative Example 1: Supported Catalyst Manufactured Only by Applying Heat to First Temperature During Heat Treatment in Complex Manner A supported catalyst was manufactured in the same manner as in Example 1, with the exception that heat was applied to the first temperature once only during heat treatment in a complex manner.

Comparative Example 2: Supported Catalyst Manufactured by Excluding Cooling to Fourth Temperature During Heat Treatment in Complex Manner A supported catalyst was manufactured in the same manner as in Example 1, with the exception that all steps of heat treatment in a complex manner, other than cooling to the fourth temperature, were performed once.

Comparative Example 3: Supported Catalyst Manufactured by Performing Heat Treatment in Complex Manner Once A supported catalyst was manufactured in the same manner as in Example 1, with the exception that the cycle of heat treatment in a complex manner was performed once only.

Comparative Example 4: Existing Supported Catalyst

An existing supported catalyst, in which surface polymerization with a conductive polymer and heat treatment in a complex manner were not performed, was used.

Comparative Example 5: Supported Catalyst Manufactured by Applying Heat to Temperature Outside First Temperature Range During Heat Treatment in Complex Manner A supported catalyst was manufactured in the same manner as in Example 1, with the exception that heat was applied to achieve a first temperature of 600° C., rather than 500° C., during heat treatment in a complex manner.

Comparative Example 6-1 to Comparative Example 6-4: Supported Catalyst Manufactured by Applying Heat Outside Repeated Heat Treatment Time Range During Heat Treatment in Complex Manner Each supported catalyst was manufactured in the same manner as in Example 1, with the exception that heat was applied for 2 hours (Comparative Example 6-1), 3 hours (Comparative Example 6-2), 4 hours (Comparative Example 6-3), and 50 hours (Comparative Example 6-4), rather than 30 hours as the repeated heat treatment time during heat treatment in a complex manner.

Comparative Example 7: Supported Catalyst Manufactured by Excluding Only Repeated Heat Treatment During Heat Treatment in Complex Manner A supported catalyst was manufactured in the same manner as in Example 1, with the exception that all steps of heat treatment in a complex manner, other than repeated heat treatment, were performed once.

Test Example 1: Half-Cell Test Analysis of Supported Catalyst Per Step of Applying Heat in Complex Manner The supported catalyst according to Example 1 and Comparative Examples 1 to 4 was manufactured and then washed, after which 0.05 g of the supported catalyst was dispersed in ethanol to afford catalyst ink, after which the catalyst ink (0.05 g of the catalyst dispersed in ethanol) was dropped on the electrode of a rotating disk electrode (RDE) and dried, followed by a half-cell test. The results thereof are shown in FIGS. 6 and 7 and in Table 1 below.

Figure 6:
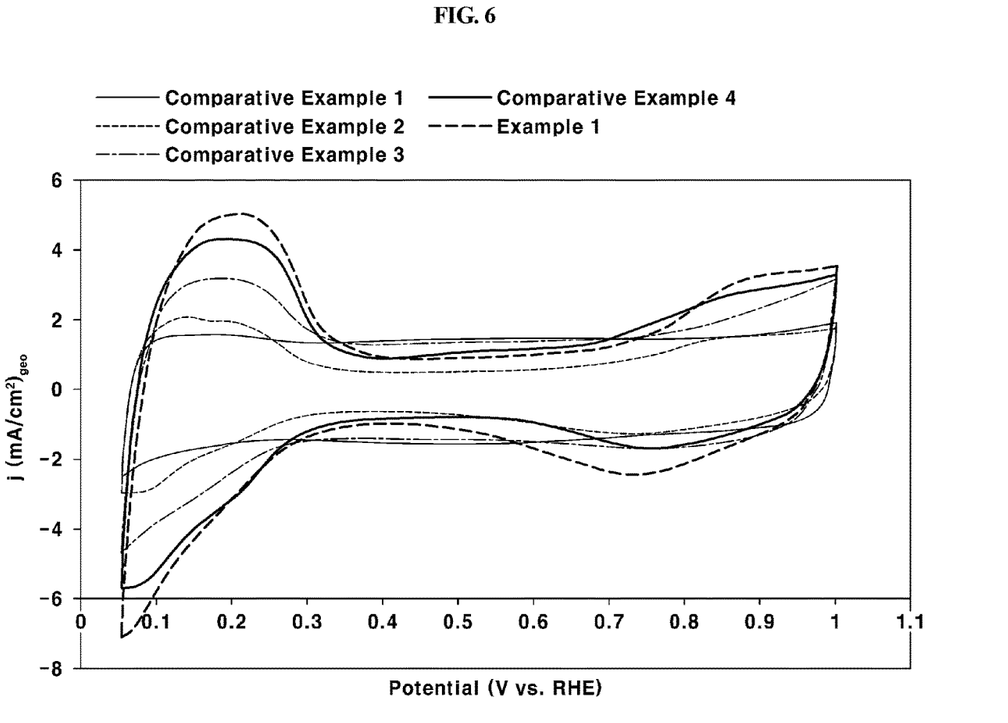
FIG. 6 shows a CV graph for analyzing the electrochemically active surface area (ECSA) of the electrode manufactured using the supported catalyst according to Example 1 and Comparative Examples 1 to 4.

FIG. 6 shows a CV graph for analyzing the electrochemically active surface area (ECSA) of the electrode manufactured using the supported catalyst according to Example 1 and Comparative Examples 1 to 4.

Figure 7:
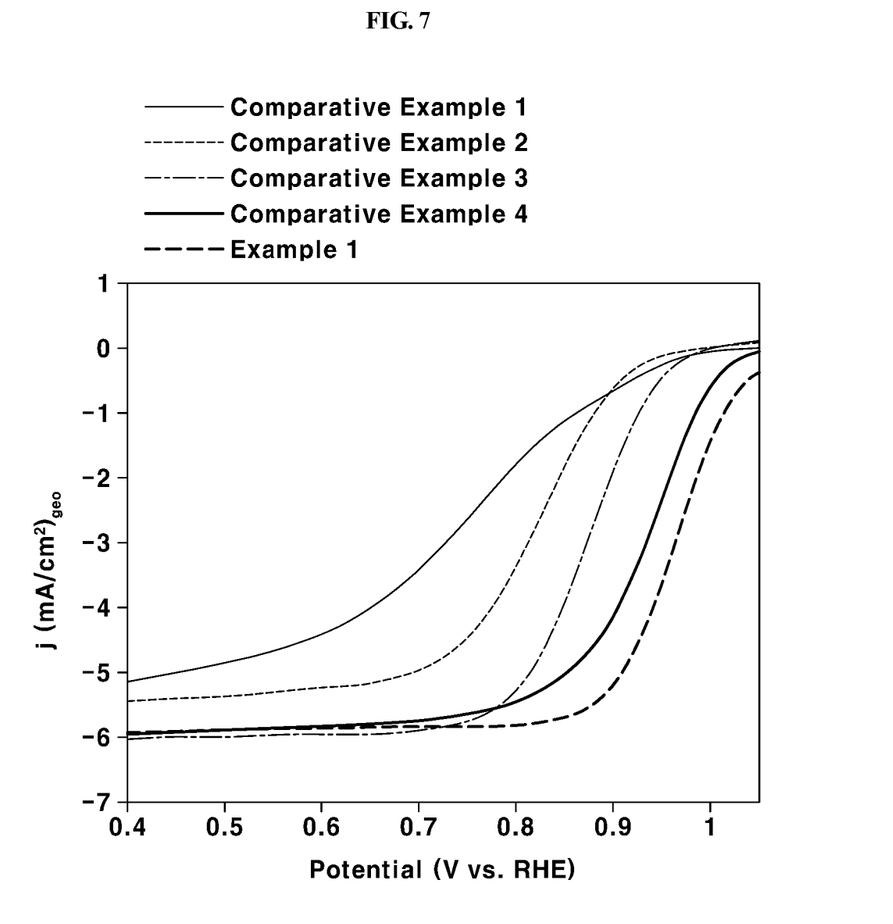
FIG. 7 is a graph showing the results of analysis of catalytic activity during an oxygen reduction reaction (ORR) of the electrode manufactured using the supported catalyst according to Example 1 and Comparative Examples 1 to 4.

In addition, FIG. 7 is a graph showing the results of analysis of catalytic activity during an oxygen reduction reaction (ORR) of the electrode manufactured using the supported catalyst according to Example 1 and Comparative Examples 1 to 4.

TABLE 1

|  | Comparative Example 1 | Comparative Example 2 | Comparative Example 3 | Comparative Example 4 | Example 1 |
|---|---|---|---|---|---|
| ECSA (m$^2$/g) | 7.91 | 21.99 | 46.22 | 60.50 | 63.80 |
| $E_{1/2}$ (V) | 0.73 | 0.82 | 0.87 | 0.94 | 0.96 |

As shown in Table 1 and FIG. 6, the electrochemically active surface area (ECSA) of the electrode, or the specific surface area directly related to the electrochemical activity (ORR) of the catalyst in each CV graph, can be determined by calculating the area value for the peak occurring in the voltage range of 0.1 to (0.3-0.4) V. The electrode manufactured in Comparative Example 1 exhibited almost no ECSA because the conductive polymer thickly surrounding the surface of the supported catalyst was not yet etched and because the structure of the support composed of amorphous carbon was not controlled, and thus the catalyst particles were aggregated. In contrast, the electrode manufactured in Example 1, in which the support had a hollow form through sufficient structural control by applying heat in a complex manner, and in which the exposure of the catalytic metal supported thereon to the reactive gas was sufficiently increased, exhibited greatly increased ECSA. Meanwhile, the ECSA of the electrode according to Comparative Examples 2 and 3 was smaller than the ECSA of the electrode according to Comparative Example 4, which is the existing supported catalyst. This is because the ECSA was measured during the step of increasing the exposure of the catalytic metal through heating to the first temperature and repeated heat treatment and was in the state before uniform dispersion of the catalytic metal, and was thus smaller than the ECSA of Comparative Example 4, which is the existing supported catalyst.

In addition, in the electric double layer region (flat portion of 0.4 to 0.6 V, arrow portion in FIG. 6), the electrode manufactured in Comparative Example 1 appeared thick in the state in which the support was thick and the polymer was not etched, and the electrode manufactured in Example 1, the structure of which was sufficiently controlled through the present process, exhibited a thinned electric double layer region.

In addition, as shown in Table 1 and FIG. 7, the half-wave potential can be expressed as the x-axis value of the point that meets the graph when a straight line parallel to the y-axis is drawn at 0.5 a (the portion where the potential difference is halved). The higher the $E_{1/2}$ (half-wave) value, the better the catalytic activity. Here, the electrode manufactured in Comparative Example 1 exhibited almost no catalytic activity, but the electrode manufactured in Example 1, in which the exposure to the reactive gas was increased through sufficient structural control using the heat treatment process according to an exemplary embodiment of the present invention, exhibited an $E_{1/2}$ value moved toward the right (increased catalytic activity).

Specifically, since the support in the supported catalyst manufactured using the manufacturing method according to an exemplary embodiment of the present invention includes a hollow form having a predetermined size, the electrode manufactured using the supported catalyst may ensure a desired electrode thickness even when used in a relatively small amount compared to the conventional technology. Moreover, there is an advantage of ensuring a high electrochemically active surface area (ECSA) and superior catalytic activity.

Test Example 2: Half-Cell Test Analysis with Supported Catalyst Manufactured by Applying Heat to Temperature Outside First Temperature Range During Heat Treatment in Complex Manner The supported catalyst according to Example 1 and Comparative Example 5 was manufactured, and the half-cell test thereof was performed according to Test Example 1. The results thereof are shown in Table 2 below.

TABLE 2

| | Example 1 | Comparative Example 5 |
|---|---|---|
| ECSA (m$^2$/g) | 63.80 | 12.55 |
| $E_{1/2}$ (V) | 0.96 | 0.78 |

As shown in Table 2, the electrode including the supported catalyst according to Comparative Example 5, manufactured by applying heat to a temperature outside the first temperature range, exhibited a low electrochemically active surface area (ECSA) compared to the electrode manufactured according to Example 1. Specifically, heating to the first temperature in the method of manufacturing, e.g., by heat treatment, the supported catalyst according to an exemplary embodiment of the present invention must be performed in the first temperature range in order to ensure superior catalytic activity of the supported catalyst thus manufactured and to attain a superior electrochemically active surface area (ECSA) of the metal thus manufactured.

Test Example 3: Half-Cell Test Analysis with Supported Catalyst Manufactured by Applying Heat for Time Outside Repeated Heat Treatment Time Range During Heat Treatment in Complex Manner or by Omitting Repeated Heat Treatment The supported catalyst according to Example 1 and Comparative Examples 6-1 to 6-4 was manufactured, and the half-cell test thereof was performed according to Test Example 1. The results thereof are shown in FIG. 8.

Figure 8:
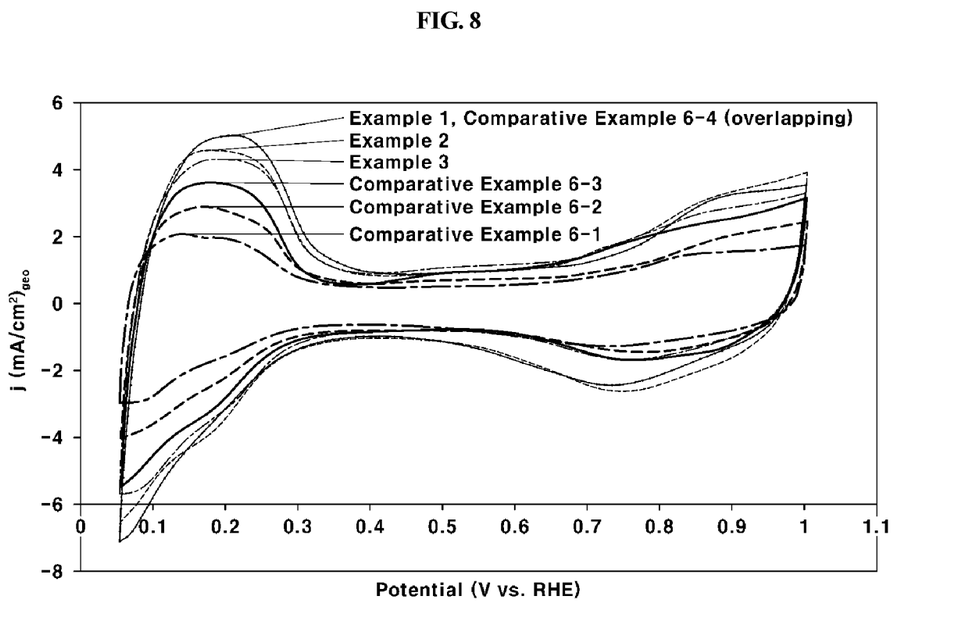
FIG. 8 is a CV graph for analyzing the electrochemically active surface area (ECSA) of the electrode manufactured using the supported catalyst according to Example 1 and Comparative Examples 6-1 to 6-4.

FIG. 8 shows a CV graph for analyzing the electrochemically active surface area (ECSA) of the electrode manufactured using the supported catalyst according to Example 1 and Comparative Examples 6-1 to 6-4.

As shows in FIG. 8, compared to the electrode manufactured by including the supported catalyst according to Example 3, manufactured through repeated heat treatment for 5 hours, in Comparative Examples 6-1 to 6-3, in which the repeated heat treatment time was short, there was a great ECSA difference. In addition, compared to the electrode manufactured by including the supported catalyst according to Example 1, manufactured through repeated heat treatment for 30 hours, in the electrode according to Comparative Example 6-4, in which the repeated heat treatment time was long, the catalytic metal was already uniformly dispersed, and thus, even when the repeated heat treatment time was long, a greater ECSA was not exhibited.

In addition, the supported catalyst according to Example 1 and Comparative Example 7 was manufactured, and the average particle size of the supported catalyst and the standard deviation thereof were calculated, and the results thereof are shown in Table 3 below.

TABLE 3

| | Example 1 | Comparative Example 7 |
|---|---|---|
| Average particle size (nm) | 110 | 180 |
| Standard deviation (nm) | ±25 | ±68 |

As shown in Table 3, the supported catalyst according to Example 1 was manufactured through repeated heat treatment, so the average particle size of the supported catalyst was about 110 nm, and the standard deviation thereof was small, indicating that the size deviation was decreased. However, the average particle size of the supported catalyst according to Comparative Example 7, in which repeated heat treatment was not performed, was relatively large, and the standard deviation thereof was also larger. Specifically, the repeated heat treatment in the method of manufacturing, e.g., by heat treatment, the supported catalyst according to an exemplary embodiment of the present invention must be performed within the repeated heat treatment time range in order to ensure superior catalytic activity of the supported catalyst thus manufactured and to attain a superior electrochemically active surface area (ECSA) of the metal thus manufactured.

In addition, a supported catalyst having a small standard deviation of the average particle size of about 100 nm can be obtained through repeated heat treatment.

Accordingly, the method of manufacturing, e.g., by heat treatment, the supported catalyst according to various exemplary embodiments of the present invention is capable of preventing the growth of catalytic metal particles simply by repeatedly applying heat in a complex manner, and may provide simpler and more economical than the conventional process.

In addition, since the support in the supported catalyst manufactured using the above method includes a hollow having a predetermined size, the electrode manufactured using the supported catalyst may ensure a desired electrode thickness even when used in a relatively small amount compared to the conventional technology. Moreover, since water generated during operation of a fuel cell can be efficiently discharged, desired mass transfer resistance can be exhibited, and a high electrochemically active surface area (ECSA) and superior catalytic activity can be ensured.

What is claimed is:

1. A method of manufacturing a supported catalyst, comprising:
    preparing a supported catalyst comprising a catalytic metal and a carbon support, wherein the catalytic metal is supported on the carbon support; and
    heat treating the supported catalyst,
    wherein the heat treating comprises:
        first heating the supported catalyst to a first temperature;
        second heating the supported catalyst to a second temperature;
        first cooling to a third temperature;
        second cooling to a fourth temperature,
    wherein a process comprising the second heating and the first cooling are repeated at least one time,
    wherein the heat treating is repeated at least one time.

2. The method of claim 1, wherein the supported catalyst comprises one or more catalytic metals supported on the carbon support.

3. The method of claim 2, wherein the catalytic metal comprises one or more metal selected from the group consisting of platinum (Pt), iridium (Ir), rhodium (Rh), ruthenium (Ru), palladium (Pd), gold (Au), silver (Ag), cobalt (Co), iron (Fe), nickel (Ni), manganese (Mn), copper (Cu), chromium (Cr), and zirconium (Zr).

4. The method of claim 1, wherein the manufacturing of the supported catalyst further comprises subjecting the prepared supported catalyst to surface polymerization with a conductive polymer.

5. The method of claim 4, wherein the conductive polymer comprises one or more selected from the group consisting of poly(3,4-ethylenedioxythiophene) [PEDOT], polyacetylene, polyphenylene vinylene, polypyrrole, polythiophene, polyaniline, and polyphenylene sulfide.

6. The method of claim 1, wherein the first heating is performed for 30 to 90 minutes at a temperature of 400 to 590° C.

7. The method of claim 1, further comprising, after the first heating and before the second heating, third cooling the supported catalyst to a fifth temperature of 290 to 310° C.

8. The method of claim 1, wherein the second temperature is of 340 to 360° C.

9. The method of claim 1, wherein the third temperature is of 240 to 260° C.

10. The method of claim 1, wherein, in the second heating, the supported catalyst is maintained at the second temperature for a predetermined time.

11. The method of claim 10, wherein the predetermined time for maintaining the second temperature is 8 to 12 minutes.

12. The method of claim 1, wherein, in the third cooling, the supported catalyst is maintained at the third temperature for a predetermined time.

13. The method of claim 12, wherein the predetermined time for maintaining the third temperature is 8 to 12 minutes.

14. The method of claim 1, wherein, the process comprising the second heating and the first cooling is performed and repeated for 5 to 30 hours.

15. The method of claim 1, wherein, the process comprising the second heating and the first cooling repeated is for 15 to 90 times.

16. The method of claim 1, wherein the fourth temperature is 23 to 27° C.

17. The method of claim 1, wherein, the second cooling is for 5 seconds or less before repeating the process comprising the second heating and the first cooling.

18. The method of claim 1, wherein the heat treating of the supported catalyst is performed 3 times or more.

19. A supported catalyst comprising a catalytic metal and a carbon support, manufactured using a method of claim 1.

20. The supported catalyst of claim 19, wherein the carbon support comprises a hollow form having a size of 10 to 100 nm.

* * * * *